(12) United States Patent
Asterjadhi et al.

(10) Patent No.: US 10,383,053 B2
(45) Date of Patent: Aug. 13, 2019

(54) TECHNIQUES FOR PERFORMING AN INTRA-FRAME OPERATION BASED AT LEAST IN PART ON IDENTIFIERS IN A WIRELESS LOCAL AREA NETWORK PHYSICAL LAYER HEADER

(71) Applicant: QUALCOMM Incorporated, San Diego, CA (US)

(72) Inventors: Alfred Asterjadhi, San Diego, CA (US); Simone Merlin, San Diego, CA (US); George Cherian, San Diego, CA (US); Gwendolyn Denise Barriac, Encinitas, CA (US); Gang Ding, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 15/146,381

(22) Filed: May 4, 2016

(65) Prior Publication Data
US 2016/0330685 A1 Nov. 10, 2016

Related U.S. Application Data

(60) Provisional application No. 62/157,884, filed on May 6, 2015, provisional application No. 62/217,546, filed
(Continued)

(51) Int. Cl.
*H04W 52/02* (2009.01)
*H04L 12/18* (2006.01)
(Continued)

(52) U.S. Cl.
CPC ..... *H04W 52/0212* (2013.01); *H04L 12/1886* (2013.01); *H04W 48/10* (2013.01);
(Continued)

(58) Field of Classification Search
CPC ............ H04W 52/0212; H04W 48/10; H04W 52/0219; H04L 12/1886
See application file for complete search history.

(56) References Cited

U.S. PATENT DOCUMENTS

| | | | | |
|---|---|---|---|---|
| 2014/0307726 A1* | 10/2014 | Kang | ................. | H04W 76/023 370/338 |
| 2016/0150469 A1* | 5/2016 | Hsu | ................... | H04W 52/0206 370/311 |
| 2016/0330788 A1* | 11/2016 | Zheng | ............... | H04W 28/0205 |

FOREIGN PATENT DOCUMENTS

| | | |
|---|---|---|
| EP | 2357773 A2 | 8/2011 |
| EP | 2602949 A2 | 6/2013 |

(Continued)

OTHER PUBLICATIONS

ISA/EP, International Search Report and Written Opinion of the International Searching Authority, Int'l Application No. PCT/US2016/030966, dated Oct. 14, 2016, European Patent Office, Rijswijk, NL, 11 pgs.

*Primary Examiner* — Afshawn M Towfighi
(74) *Attorney, Agent, or Firm* — Holland & Hart LLP/Qualcomm

(57) ABSTRACT

Methods, systems, and devices are described for wireless communication at a receiving device. A receiving device may receive a first physical layer header of a first wireless local area network (WLAN) protocol data unit over a shared radio frequency spectrum band. The first physical layer header may include at least a first basic service set (BSS) identifier and a first device association identifier (AID). The receiving device may perform, based at least in part on the first BSS identifier and the first device AID, an intra-frame operation including a power saving operation and/or a receive filtering operation.

44 Claims, 10 Drawing Sheets

Related U.S. Application Data on Sep. 11, 2015, provisional application No. 62/243,551, filed on Oct. 19, 2015, provisional application No. 62/244,080, filed on Oct. 20, 2015.

(51) Int. Cl.
  *H04W 48/10* (2009.01)
  *H04W 84/12* (2009.01)

(52) U.S. Cl.
  CPC ........ *H04W 52/0219* (2013.01); *H04W 84/12* (2013.01); *Y02D 70/142* (2018.01); *Y02D 70/22* (2018.01)

(56) References Cited

FOREIGN PATENT DOCUMENTS

| | | |
|---|---|---|
| WO | WO-2012064837 A2 | 5/2012 |
| WO | WO-2012068384 A2 | 5/2012 |

\* cited by examiner

TECHNIQUES FOR PERFORMING AN INTRA-FRAME OPERATION BASED AT LEAST IN PART ON IDENTIFIERS IN A WIRELESS LOCAL AREA NETWORK PHYSICAL LAYER HEADER

CROSS REFERENCES

The present application for patent claims priority to U.S. Provisional Patent Application No. 62/157,884 by Asterjadhi et al., entitled "Techniques for Performing an Intra-Frame Operation Based at Least in Part on Identifiers in a Wireless Local Area Network Physical Layer Header," filed May 6, 2015; Application No. 62/217,546 by Asterjadhi et al., entitled "Techniques for Performing an Intra-Frame Operation Based at Least in Part on Identifiers in a Wireless Local Area Network Physical Layer Header," filed Sep. 11, 2015; Application No. 62/243,551 by Asterjadhi et al., entitled "Techniques for Performing an Intra-Frame Operation Based at Least in Part on Identifiers in a Wireless Local Area Network Physical Layer Header," filed Oct. 19, 2015; and Application No. 62/244,080 by Asterjadhi et al., entitled "Techniques for Performing an Intra-Frame Operation Based at Least in Part on Identifiers in a Wireless Local Area Network Physical Layer Header," filed Oct. 20, 2015, assigned to the assignee hereof.

BACKGROUND

Field of the Disclosure

The present disclosure relates to wireless communication, and more particularly to techniques for performing an intra-frame operation based at least in part on identifiers in a wireless local area network (WLAN) physical layer header.

Description of Related Art

Wireless communications systems are widely deployed to provide various types of communication content, such as voice, video, packet data, messaging, broadcast, and so on. These systems may be multiple-access systems capable of supporting communication with multiple users by sharing the available system resources (e.g., time, frequency, and power). A wireless network (e.g., a WLAN, such as a Wi-Fi network conforming to one or more of the IEEE 802.11 family of standards) may include an access point (AP) that may communicate with one or more stations (STAs) or mobile devices. The AP may be coupled to a network, such as the Internet, and may enable a station or mobile device to communicate via the network (or communicate with other devices coupled to the AP in a service set, e.g., a basic service set (BSS) or extended service set (ESS)). A station may communicate with an associated AP bi-directionally. For example, a station may communicate with an associated AP via a downlink (DL) and an uplink (UL). The DL (or forward link) may refer to a communication link carrying transmissions from the AP to the station, and the UL (or reverse link) may refer to a communication link carrying transmissions from the station to the AP. To conserve power, a station may enter a power save mode (or use system resources for other purposes) when a received transmission is not intended for the station. Furthermore, to increase the likelihood of receiving and properly decoding a transmission, a device (e.g., an AP or station) may discontinue decoding a transmission upon determining that the transmission is not intended for the device.

SUMMARY

The present disclosure may relate to systems, methods, or apparatuses for performing an intra-frame operation based at least in part on identifiers in a wireless local area network (WLAN) physical layer header. A new variant of the IEEE 802.11 family of standards is the IEEE 802.11ax standard. The IEEE 802.11ax standard provides for a frame including a number of high efficiency WLAN signaling fields. The present disclosure describes identifiers that may be included in the high efficiency WLAN signaling fields, and techniques for performing an intra-frame operation based at least in part on one or more of the identifiers. The intra-frame operation may include a power saving operation or a receive filtering operation.

A method for wireless communication at a receiving device is described. The method includes receiving a first physical layer header of a first WLAN protocol data unit over a shared radio frequency spectrum band. The first physical layer header may include at least a first basic service set (BSS) identifier and a first device association identifier (AID). The method also includes performing, based at least in part on the first BSS identifier and the first device AID, an intra-frame operation selected from the group consisting of: a power saving operation and a receive filtering operation.

An apparatus for wireless communication at a receiving device is described. The apparatus includes a physical layer header processor to receive a first physical layer header of a first WLAN protocol data unit over a shared radio frequency spectrum band. The first physical layer header may include at least a first BSS identifier and a first device AID. The apparatus also includes an intra-frame operations manager to perform, based at least in part on the first BSS identifier and the first device AID, an intra-frame operation selected from a group consisting of: a power saving operation and a receive filtering operation.

Another apparatus for wireless communication at a receiving device is described. The apparatus includes means for receiving a first physical layer header of a first WLAN protocol data unit over a shared radio frequency spectrum band. The first physical layer header may include at least a first BSS identifier and a first device AID. The apparatus also include means for performing, based at least in part on the first BSS identifier and the first device AID, an intra-frame operation selected from a group consisting of: a power saving operation and a receive filtering operation.

A non-transitory computer-readable medium storing code for wireless communication at a receiving device is described. The code includes instructions executable to cause the receiving device to receive a first physical layer header of a first WLAN protocol data unit over a shared radio frequency spectrum band. The first physical layer header may include at least a first BSS identifier and a first device AID. The code also includes instructions executable to cause the receiving device to perform, based at least in part on the first BSS identifier and the first device AID, an intra-frame operation selected from a group consisting of: a power saving operation and a receive filtering operation.

A second BSS identifier may be compared to the first BSS identifier; a second device AID may be compared to the first device AID; and the intra-frame operation may be performed based at least in part on the comparisons. The second BSS identifier may identify a BSS used by the receiving device, and the second device AID may be an AID of the receiving device.

When the intra-frame operation is a power saving operation, performing the power saving operation may include entering a power save mode for a remainder of the first WLAN protocol data unit based at least in part on the second BSS identifier matching the first BSS identifier and the second device AID not matching the first device AID. In some examples, a broadcast/multicast AID may be compared to the first device AID, and entering the power save mode for the remainder of the first WLAN protocol data unit may be further based at least in part on the broadcast/multicast AID not matching the first device AID.

When the intra-frame operation is a receive filtering operation, performing the receive filtering operation may include discontinuing a decoding of the first WLAN protocol data unit based at least in part on the second BSS identifier not matching the first BSS identifier, and/or discontinuing the decoding of the first WLAN protocol data unit based at least in part on the second device AID not matching the first device AID. In examples in which a broadcast/multicast AID is compared to the first device AID, performing the receive filtering operation may include discontinuing a decoding of the first WLAN protocol data unit based at least in part on the second BSS identifier not matching the first BSS identifier, and/or discontinuing the decoding of the first WLAN protocol data unit based at least in part on the second device AID not matching the first device AID and the broadcast/multicast AID not matching the first device AID. In some examples, a second physical layer header of a second WLAN protocol data unit may be received over the shared radio frequency spectrum band, during transmission of the first WLAN protocol data unit, after discontinuing the decoding of the first WLAN protocol data unit.

The first device AID may in some embodiments include a partial AID of an intended station receiver of the first WLAN protocol data unit exclusive-ORed (XORed) with a partial basic service set identifier (BSSID). Alternatively, the first device AID may include a partial BSSID of an intended AP receiver of the first WLAN protocol data unit. In some examples, receiving the first physical layer header may include receiving the first BSS identifier in a first WLAN signaling field, and receiving the first device AID in a second WLAN signaling field. The first WLAN signaling field and the second WLAN signaling field may be separately encoded.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to techniques for performing an intra-frame operation using identifiers in physical layer headers, such as basic service set (BSS) identifiers and device association identifiers (AIDs). For example, based at least in part on one or more of the identifiers, a wireless device may power down portions of a receiver front-end, discontinue decoding a WLAN protocol data unit, or collect statistical data (e.g., power, interference, inter-packet arrival delays, fairness, etc.) from a BSS to which the device belongs. The device may additionally or alternatively collect statistical data from devices communicating within the BSS or other BSSs.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
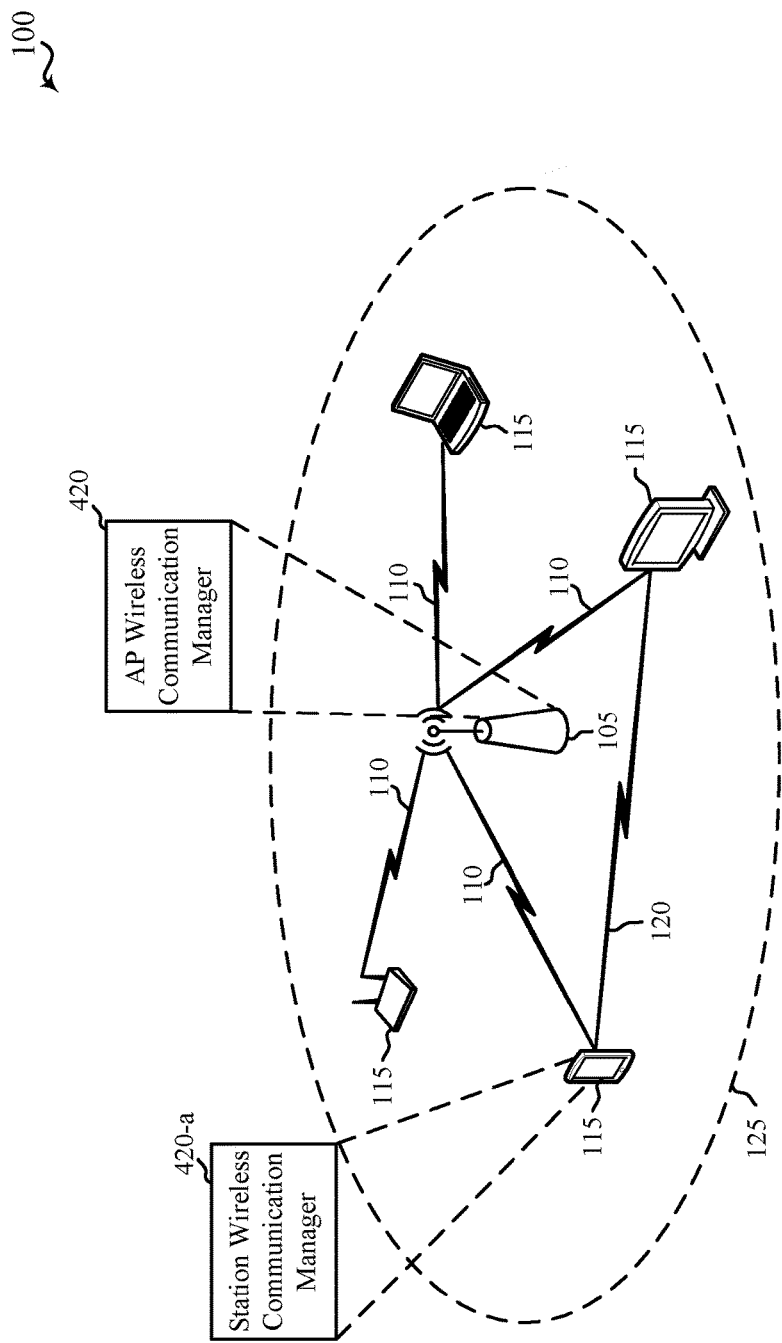
FIG. 1 shows a block diagram of a WLAN, in accordance with various aspects of the present disclosure.

Referring first to FIG. 1, a block diagram illustrates an example of a WLAN 100 (e.g., a network implementing at least one of the IEEE 802.11 family of standards), in accordance with various aspects of the present disclosure. The WLAN 100 may include an AP 105 and one or more wireless devices or stations (STAs) 115, such as mobile stations, personal digital assistants (PDAs), other handheld devices, netbooks, notebook computers, tablet computers, laptops, display devices (e.g., TVs, computer monitors, etc.), printers, etc. While one AP 105 is illustrated, the WLAN 100 may include multiple APs 105. Each of the stations 115, which may include, e.g., mobile stations (MSs), mobile devices, access terminals (ATs), user equipments (UEs), subscriber stations (SSs), or subscriber units, may associate and communicate with the AP 105 via a communication link 110. Each AP 105 may have a geographic coverage area 125, such that stations 115 within the geographic coverage area 125 can typically communicate with the AP 105. The stations 115 may be dispersed throughout the geographic coverage area 125. Each station 115 may be stationary or mobile.

Although not shown in FIG. 1, a station 115 can be covered by more than one AP 105 and can therefore associate with one or more APs 105 at different times. A single AP 105 and an associated set of stations may be referred to as a BSS. An extended service set (ESS) may include a set of connected BSSs. A distribution system (DS) (not shown) may be used to connect APs 105 in an ESS. A geographic coverage area 125 for an AP 105 may be divided into sectors, with each sector including a portion of the coverage area (not shown). The WLAN 100 may include APs 105 of different types (e.g., metropolitan area, home network, etc.), with varying sizes of coverage areas and overlapping coverage areas for different technologies. Although not shown, other wireless devices can communicate with the AP 105.

While the stations 115 may communicate with each other through the AP 105 using communication links 110, a station 115 may also communicate directly with another station 115 via a direct wireless link 120. Two or more stations 115 may communicate via a direct wireless link 120 when both stations 115 are in the geographic coverage area 125 of an AP 105, or when one or neither station 115 is within the geographic coverage area 125 of the AP 105 (not shown). Examples of direct wireless links 120 may include Wi-Fi Direct connections, connections established using a Wi-Fi Tunneled Direct Link Setup (TDLS) link, and other peer-to-peer (P2P) group connections. The stations 115 in these examples may communicate according to a WLAN radio and baseband protocol, including physical (PHY) and medium access control (MAC) layers, described by the IEEE 802.11 family of standards, including, but not limited to, 802.11b, 802.11g, 802.11a, 802.11n, 802.11ac, 802.11ad, 802.11ah, 802.11ax, etc. In other implementations, other P2P connections and/or ad hoc networks may be implemented within the WLAN 100.

In the WLAN 100, an AP 105 may transmit messages to or receive messages from at least one station 115 according to various versions of the IEEE 802.11 standard, including new wireless standards. The AP 105 may include an AP wireless communication manager 420. The AP wireless communication manager 420 may be used to receive a physical layer header of a WLAN protocol data unit over a shared radio frequency spectrum band. The physical layer header may include an identifier of a BSS, a device AID, an UL/DL indicator (e.g., an UL/DL flag), and/or other indicators. The AP wireless communication manager 420 may perform an intra-frame operation based at least in part on one or more of the identifiers included in the physical layer header, and in some cases may perform a receive filtering operation or a statistics collection operation.

Each of the stations 115 may include a station wireless communication manager 420-*a*. The station wireless communication manager 420-*a* may be used to receive a physical layer header of a WLAN protocol data unit over a shared radio frequency spectrum band, and may perform an intra-frame operation such as a power saving operation and/or a receive filtering operation. The intra-frame operation may be based at least in part on one or more identifiers included in the physical layer header (e.g., an identifier of a BSS, a device AID, an UL/DL indicator, and/or other indicators).

When the intra-frame operation performed by a device is a statistics collection operation, the device (e.g., a station or AP) may collect statistics regarding the behavior of devices in its surroundings. In some cases a station may, based on the determination of the BSS identifier, detect malicious or aggressive behavior and may report such information to the AP with which it is associated. The AP may in turn report this information to the AP of the BSS which is performing maliciously or aggressively. Alternatively, the station may directly report this behavior to the AP of the malfunctioning BSS. In some examples, the station may detect that other BSSs are using the same BSS identifier as the BSS within which it is operating and similarly may report this information to the AP. In response, the AP may decide to take counter measures to limit the impact of the operation of other BSSs in the area. In some cases, the AP may decide to forbid its stations from going to into a doze state during PPDUs that have the same value of its BSS identifier to prevent station from failing to receive transmitted frames due to the sleep mode.

Figure 2:
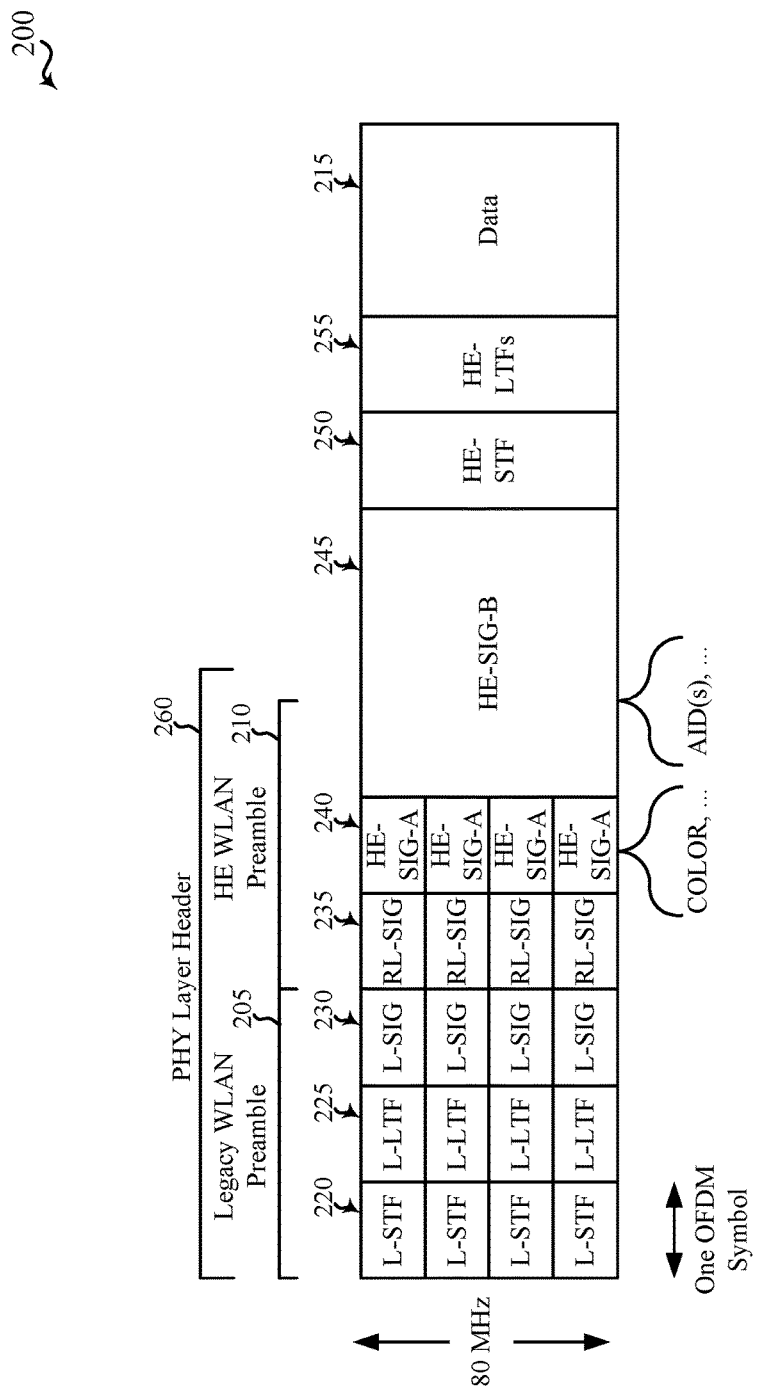
FIG. 2 shows an example of a WLAN protocol data unit usable for communications between APs and stations, in accordance with various aspects of the present disclosure.

FIG. 2 shows an example of a WLAN protocol data unit 200 (e.g., a physical layer convergence protocol data unit (PPDU)) usable for communications between APs and stations, in accordance with various aspects of the present disclosure. The AP may be an example of aspects of the AP 105 described with reference to FIG. 1, and the stations may be examples of aspects of the stations 115 described with reference to FIG. 1.

The WLAN protocol data unit 200 may include a PHY layer header 260 and a data field 215 (e.g., including one or more of a service field, a MAC protocol data unit (MPDU) or physical layer service data unit (PSDU) which in turn may contain one or more MPDUs). The PHY layer header 260 may include a legacy WLAN preamble 205 and/or a high efficiency (HE) WLAN preamble 210. The preambles and data field may be transmitted in the following order: legacy WLAN preamble 205, high efficiency WLAN preamble 210, data field 215. The WLAN protocol data unit 200 may be transmitted over a radio frequency spectrum band, which in some examples may include a plurality of sub-bands. In some examples, the radio frequency spectrum band may have a bandwidth of 80 MHz, and each of the sub-bands may have a bandwidth of 20 MHz.

The legacy WLAN preamble 205 may include legacy short training field (L-STF) information 220, legacy long training field (L-LTF) information 225, and/or legacy signaling (L-SIG) information 230. When the radio frequency spectrum band includes a plurality of sub-bands, the L-STF, L-LTF, and L-SIG information may be duplicated and transmitted in each of the plurality of sub-bands.

The high efficiency WLAN preamble 210 may include a repeated legacy WLAN signaling (RL-SIG) field 235, a first WLAN signaling field 240 (e.g., a first high efficiency WLAN signaling field), a second WLAN signaling field 245 (e.g., a second high efficiency WLAN signaling field), a WLAN STF (e.g., a high efficiency WLAN STF, labeled HE-STF 250), and/or at least one WLAN LTF (e.g., at least one high efficiency WLAN LTF, labeled HE-LTFs 255).

When the radio frequency spectrum band includes a plurality of sub-bands, the L-SIG information 230 (from the legacy WLAN preamble 205) may be duplicated and transmitted in each sub-band of the repeated legacy WLAN signaling field 235 as RL-SIG information. The repeated legacy WLAN signaling field 235 may indicate to a station that the WLAN protocol data unit 200 is an IEEE 802.11ax WLAN protocol data unit.

The first WLAN signaling field 240 may include high efficiency WLAN signaling information usable by APs and stations other than a number of APs or stations identified to receive or transmit communications in the WLAN protocol data unit 200. The first WLAN signaling field 240 may also include information usable by the identified number of APs or stations to decode the second WLAN signaling field 245. When the radio frequency spectrum band includes a plurality of sub-bands, the information (e.g., HE-SIG-A information) included in the first WLAN signaling field 240 may be duplicated and transmitted in each sub-band of the first WLAN signaling field 240.

The second WLAN signaling field 245 may include high efficiency WLAN signaling information usable by a number of APs or stations identified to transmit or receive communications in the WLAN protocol data unit 200. More specifically, the second WLAN signaling field 245 may include information usable by the number of APs or stations to transmit/encode or receive/decode data in the data field 215. The second WLAN signaling field 245 may be encoded separately from the first WLAN signaling field 240.

The high efficiency WLAN preamble 210 may include an identifier of a BSS, which may also be referred to as a BSS identifier. The identifier of the BSS may include a value of a COLOR field. The value of the COLOR field may be a unique or non-unique identifier of the BSS, and may be included in all WLAN protocol data units generated by the BSS's members. The value of the COLOR field may be selected by an AP during BSS initialization. A station that receives a WLAN protocol data unit that contains a COLOR field value matching a BSS used by the station may classify the WLAN protocol data unit as a "member" WLAN protocol data unit, and may otherwise classify the WLAN protocol data unit as a "non-member" WLAN protocol data unit. In some cases, a COLOR field may be included in the first WLAN signaling field 240.

The high efficiency WLAN preamble 210 may also include a number of device AIDs, such as a device AID identifying a receiver of the WLAN protocol data unit 200 and/or a device AID identifying a transmitter of the WLAN protocol data unit 200. A device AID may be a unique or non-unique identifier of a device. A device AID identifying a receiver of the WLAN protocol data unit 200 may be or include a partial AID (PAID) of an intended station receiver of the WLAN protocol data unit 200 which may be eventually exclusive-ORed (XORed) with a partial BSSID. Alternatively, a device AID identifying a receiver of the WLAN protocol data unit 200 may include a partial BSSID of an intended AP receiver of the WLAN protocol data unit 200. A device AID identifying a transmitter of the WLAN protocol data unit 200 may include a partial TAID of a station transmitter which may be eventually XORed with a partial BSSID. Alternatively, a device AID identifying a transmitter of the WLAN protocol data unit 200 may include a partial BSSID of an AP transmitter. A PAID, partial TAID, or partial BSSID may in some cases be based at least in part on a MAC ID of a station or AP. In some cases, a device AID may be included in the second WLAN signaling field 245. The high efficiency WLAN preamble 210 may further or alternatively include an uplink/downlink indicator (e.g., a binary value indicating whether a WLAN protocol data unit includes uplink transmissions or downlink transmissions).

Figure 3:
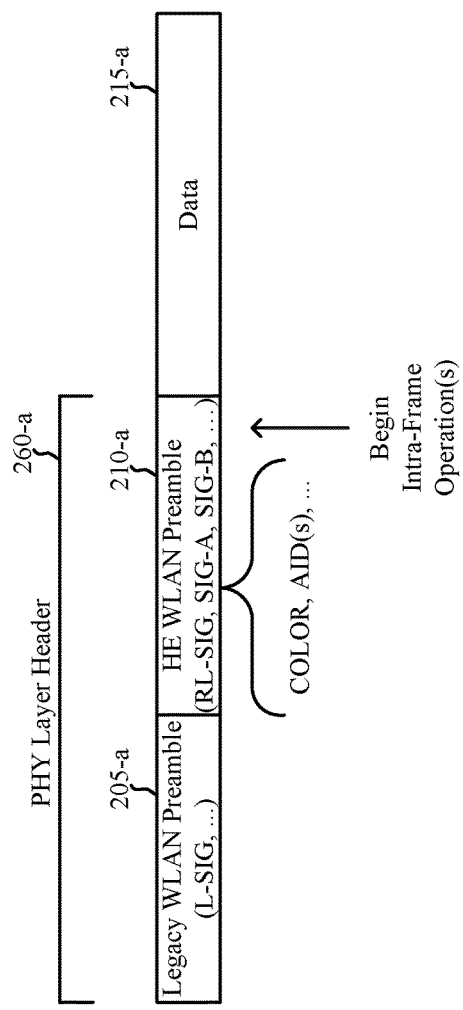
FIG. 3 shows another example of a WLAN protocol data unit usable for communications between APs and stations, in accordance with various aspects of the present disclosure.

FIG. 3 shows another example of a WLAN protocol data unit 200-a (e.g., a PPDU) usable for communications between APs and stations, in accordance with various aspects of the present disclosure. The AP may be an example of aspects of the AP 105 described with reference to FIG. 1, and the stations may be examples of aspects of the stations 115 described with reference to FIG. 1. The WLAN protocol data unit 200-a may be an example of aspects of the WLAN protocol data unit 200 described with reference to FIG. 2.

The WLAN protocol data unit 200-a may include a PHY layer header 260-a and a data field 215-a. The PHY layer header 260-a may include a legacy WLAN preamble 205-a and/or a high efficiency WLAN preamble 210-a. The PHY layer header 260-a, legacy WLAN preamble 205-a, high efficiency WLAN preamble 210-a, and data field 215-a may be examples of the PHY layer header 260, legacy WLAN preamble 205, high efficiency WLAN preamble 210, and data field 215. The high efficiency WLAN preamble 210-a may include a COLOR field, a number of device AIDs, and/or an UL/DL indicator.

In some examples, a receiving device (e.g., a device that receives at least the high efficiency WLAN preamble 210-a of the WLAN protocol data unit 200-a) may perform an intra-frame (e.g., intra-WLAN protocol data unit) operation based at least in part on a value of the COLOR field, a device AID, and/or the UL/DL indicator included in the high efficiency WLAN preamble 210-a. For example, when the high efficiency WLAN preamble 210-a includes a COLOR field, a station that receives the high efficiency WLAN preamble 210-a may compare a first identifier of a BSS, received in the COLOR field, to a second identifier of a BSS. The second identifier may identify a BSS used by the station. When the first identifier does not match the second identifier (e.g., when the WLAN protocol data unit 200-a is classified as a non-member WLAN protocol data unit), the station may in some cases enter a power save mode. However, entering the power save mode may cause the station to miss a subsequently transmitted member WLAN protocol data unit. In some embodiments, the station may enter a power save mode upon classifying the WLAN protocol data unit 200-a as a non-member WLAN protocol data unit and determining that one or more other conditions are met. The one or more other conditions may include a received signal strength (e.g., of the WLAN protocol data unit 200-a or some portion thereof (e.g., the high efficiency WLAN preamble 210-a)) exceeding a threshold signal strength. When the received signal strength is high, the likelihood of a member WLAN protocol data unit being transmitted on top of the non-member WLAN protocol data unit 200-a may be low.

When the high efficiency WLAN preamble 210-a includes a COLOR field and an UL/DL indicator, a station that receives the high efficiency WLAN preamble 210-a may compare a first identifier of a BSS, received in the COLOR field, to a second identifier of a BSS. The second identifier may identify a BSS used by the station. The station may also determine whether the UL/DL indicator indicates the WLAN protocol data unit 200-a is for uplink communications or downlink communications. When the first identifier matches the second identifier (e.g., when the WLAN protocol data unit 200-a is classified as a member WLAN protocol data unit) and the UL/DL indicator indicates the WLAN protocol data unit 200-a is for UL communications, the station may enter a power save mode (e.g., at 220) for a remainder of the WLAN protocol data unit 200-a, unless the station has received an UL grant for the WLAN protocol data unit 200-a. In some embodiments, the station should not enter the power save mode when determining that the first identifier does not match the second identifier. The station should also not enter the power save mode when determining that the first identifier matches the second identifier and either 1) determining that the station has received an UL grant for the WLAN protocol data unit 200-*a* or 2) determining that the UL/DL indicator indicates the WLAN protocol data unit 200-*a* is for DL communications.

When the high efficiency WLAN preamble 210-*a* includes a COLOR field and a first device AID, where the first device AID includes a PAID (or a PAID XORed with a partial BSSID), a station that receives the high efficiency WLAN preamble 210-*a* may compare a first identifier of a BSS, received in the COLOR field, to a second identifier of a BSS. The second identifier may identify a BSS used by the station. The station may also compare the first device AID to a second device AID of the station and/or a broadcast/multicast AID. When the first identifier matches the second identifier and the first device AID does not match the second device AID and/or the broadcast/multicast AID, the station may enter a power save mode (e.g., at 220) for a remainder of the WLAN protocol data unit 200-*a*. The station may enter the power save mode regardless of whether an UL/DL indicator indicates the WLAN protocol data unit 200-*a* is for UL communications or DL communications. In some embodiments, the station should not enter the power save mode when determining that the first identifier does not match the second identifier. The station should also not enter the power save mode when determining that the first identifier matches the second identifier and determining that the first device AID matches the second device AID and/or the broadcast/multicast AID.

When the high efficiency WLAN preamble 210-*a* includes a COLOR field and a first device AID, where the first device AID includes a partial TAID (or a partial TAID XORed with a partial BSSID), a station that receives the high efficiency WLAN preamble 210-*a* may compare a first identifier of a BSS, received in the COLOR field, to a second identifier of a BSS. The second identifier may identify a BSS used by the station. The station may also compare the first device AID to a second device AID (of an AP with which the station is associated). When the first identifier matches the second identifier and the first device AID does not match the second device AID, the station may enter a power save mode (e.g., at 220) for a remainder of the WLAN protocol data unit 200-*a*. The station may enter the power save mode regardless of whether an UL/DL indicator indicates the WLAN protocol data unit 200-*a* is for UL communications or DL communications. In some embodiments, the station should not enter the power save mode when determining that the first identifier does not match the second identifier. The station should also not enter the power save mode when determining that the first identifier matches the second identifier and determining that the first device AID matches the second device AID.

When the high efficiency WLAN preamble 210-*a* includes a COLOR field, an AP or station may compare a first identifier of a BSS, received in the COLOR field, to a second identifier of a BSS. The second identifier may identify a BSS used by the AP or station. When the first and second identifiers do not match (e.g., when the WLAN protocol data unit 200-*a* is classified as a non-member WLAN protocol data unit), the AP or station may perform a receive filtering operation (e.g., at 220) and discontinue decoding the WLAN protocol data unit 200-*a*. By discontinuing decoding the WLAN protocol data unit 200-*a*, the AP or station may devote more resources to decoding other WLAN protocol data units, and increase the likelihood of receiving and decoding the other WLAN protocol data units, which other WLAN protocol data units may be intended for the AP or station.

When the high efficiency WLAN preamble 210-*a* includes a COLOR field and an UL/DL indicator, an AP or station that receives the high efficiency WLAN preamble 210-*a* may compare a first identifier of a BSS, received in the COLOR field, to a second identifier of a BSS. The second identifier may identify a BSS used by the AP or station. The AP or station may also determine whether the UL/DL indicator indicates the WLAN protocol data unit 200-*a* is for UL communications or DL communications. When the WLAN protocol data unit 200-*a* is received by an AP, and the first identifier matches the second identifier (e.g., when the WLAN protocol data unit 200-*a* is classified as a member WLAN protocol data unit), and the UL/DL indicator indicates that the WLAN protocol data unit 200-*a* is for DL communications, the AP may perform a receive filtering operation (e.g., at 220) and discontinue decoding the WLAN protocol data unit 200-*a*. The AP may also perform the receive filtering operation when the first identifier does not match the second identifier. In some embodiments, the AP should not perform the receive filtering operation when the first identifier matches the second identifier and the UL/DL indicator indicates that the WLAN protocol data unit 200-*a* is for UL communications. When the WLAN protocol data unit 200-*a* is received by a station, and the first identifier matches the second identifier (e.g., when the WLAN protocol data unit 200-*a* is classified as a member WLAN protocol data unit), and the UL/DL indicator indicates the WLAN protocol data unit 200-*a* is for UL communications, the station may perform a receive filtering operation (e.g., at 220) and discontinue decoding the WLAN protocol data unit 200-*a*. The station may also perform the receive filtering operation when the first identifier does not match the second identifier. In some embodiments, the station should not perform the receive filtering operation when the first identifier matches the second identifier and the UL/DL indicator indicates that the WLAN protocol data unit 200-*a* is for DL communications. By discontinuing decoding the WLAN protocol data unit 200-*a*, the AP or station may devote more resources to decoding other WLAN protocol data units, and increase the likelihood of receiving and decoding the other WLAN protocol data units, which other WLAN protocol data units may be intended for the AP or station.

When the high efficiency WLAN preamble 210-*a* includes a COLOR field and a first device AID, where the first device AID includes a PAID (or a PAID XORed with a partial BSSID), an AP or station that receives the high efficiency WLAN preamble 210-*a* may compare a first identifier of a BSS, received in the COLOR field, to a second identifier of a BSS. The second identifier may identify a BSS used by the AP or station. The AP or station may also compare the first device AID to a second device AID (of the AP or station) and/or a broadcast/multicast AID. When the first and second identifiers do not match (e.g., when the WLAN protocol data unit 200-*a* is classified as a non-member WLAN protocol data unit), the AP or station may perform a receive filtering operation (e.g., at 220) and discontinue decoding the WLAN protocol data unit 200-*a*. The AP or station may also perform the receive filtering operation when the first device AID does not match the second device AID (or when the first device AID does not match the second device AID and does not match the broadcast/multicast AID). By discontinuing decoding the WLAN protocol data unit 200-*a*, the AP or station may devote more resources to decoding other WLAN protocol data units, and increase the likelihood of receiving and decoding the other WLAN protocol data units, which other WLAN protocol data units may be intended for the AP or station.

When the high efficiency WLAN preamble 210-*a* includes a COLOR field and a first device AID, where the first device AID includes a partial TAID (or a partial TAID XORed with a partial BSSID), an AP or station that receives the high efficiency WLAN preamble 210-*a* may compare a first identifier of a BSS, received in the COLOR field, to a second identifier of a BSS. The second identifier may identify a BSS used by the AP or station. The AP or station may also compare the first device AID to a second device AID (of a station or stations associated with the AP, or of an AP with which a station is associated). When the first and second identifiers do not match (e.g., when the WLAN protocol data unit 200-*a* is classified as a non-member WLAN protocol data unit), the AP or station may perform a receive filtering operation (e.g., at 220) and discontinue decoding the WLAN protocol data unit 200-*a*. The AP or station may also perform the receive filtering operation when the first device AID does not match the second device AID (or when the matching is performed by an AP, when the first device AID does not match a second device AID of any station associated with the AP). By discontinuing decoding the WLAN protocol data unit 200-*a*, the AP or station may devote more resources to decoding other WLAN protocol data units (e.g., other BSS (OBSS) WLAN protocol data units), and increase the likelihood of receiving and decoding the other WLAN protocol data units, which other WLAN protocol data units may be intended for the AP or station.

In some examples, an AP or a station associated with the AP may determine that the COLOR field and/or identifiers allocated to the station may be used by other stations and/or APs of other BSSs. In such a scenario, the station may report this event to the AP. Alternatively, the AP may make this determination. In some cases, the determination is made by inspecting a received frame for one or more identifiers in the PHY header that indicates that the frame is generated by a STA in the BSS. For example, the COLOR field may coincide with the color of the BSS. Additionally or alternatively, the UL/DL indicator may indicate that the frame is UL and an inspection of the one or more MPDUs in the PSDU of the frame may reveal that the receiver address (A1) and/or the BSSID address (A3) does not correspond to that of the AP or the BSS. A similar approach may be used for the DL case (e.g., it may be determined that the transmitter address (A2) and/or A3 does not correspond to that of the AP or to that of the BSS). In such cases, the AP may decide to switch off intra-frame operation for a certain period of time. The AP may indicate that one or more of the intra-frame operations are suspended by setting one or more bits in an information element it transmits in a management frame (e.g., probe response, beacon, etc.) to a predefined value.

In some examples, the stations in the BSS of the AP may request the AP to suspend intra-frame operations (e.g., if the stations are aware of malicious behavior or conflicting operations by other BSSs). When the AP suspends intra-frame operation, in certain examples, the stations may continue to perform intra-frame power saving operations (e.g., when the stations can determine from portions of the PSDU included in a frame that the transmitter or the receiver of that frame is the AP with which the stations are associated). Stations may make this determination by inspecting A1, A2, or A3 and determining if the frame is intended for or generated by the AP. If the frame is intended for or generated by the AP, the stations can resume power saving operations for the frame. If the frame is generated by or intended for an AP of another BSS, the frame may be discarded.

Figure 4:
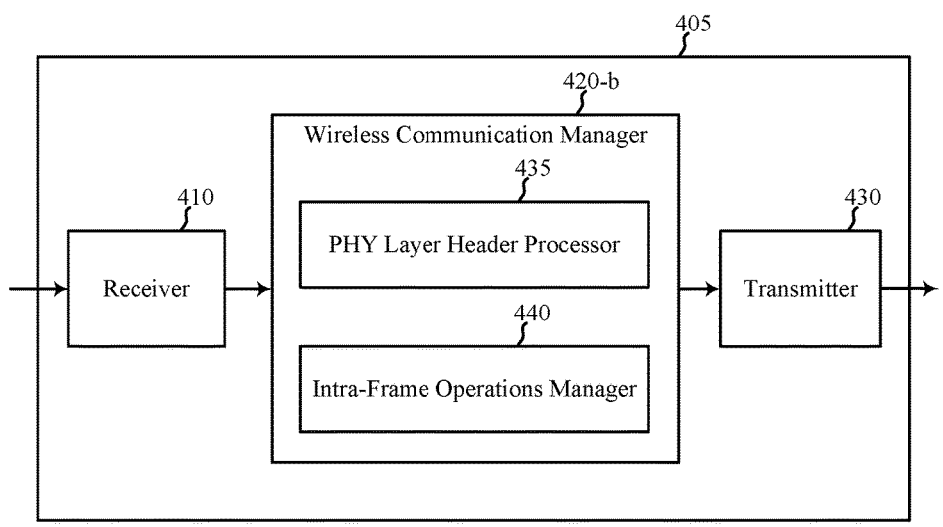
FIG. 4 shows a block diagram of an apparatus for use in wireless communication, in accordance with various aspects of the present disclosure.

FIG. 4 shows a block diagram 400 of an apparatus 405 for use in wireless communication, in accordance with various aspects of the present disclosure. The apparatus 405 may be an example of aspects of the AP 105 or stations 115 described with reference to FIG. 1. The apparatus 405 may also be or include a processor (not shown). The apparatus 405 may include a receiver 410, a wireless communication manager 420-*b*, and/or a transmitter 430. Each of these components may be in communication with each other.

The components of the apparatus 405 may, individually or collectively, be implemented using at least one application-specific integrated circuit (ASIC) adapted to perform some or all of the applicable functions in hardware. Alternatively, the functions may be performed by at least one other processing unit (or core), on at least one integrated circuit. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by at least one general and/or application-specific processor. The receiver 410 may include a radio frequency (RF) receiver. The receiver 410 and/or RF receiver may be used to receive various types of data and/or control signals (i.e., transmissions) over one or more communication links of a wireless communication system, such as one or more communication links of the WLAN 100 described with reference to FIG. 1. The transmitter 430 may include a RF transmitter. The transmitter 430 or RF transmitter may be used to transmit various types of data and/or control signals (i.e., transmissions) over one or more communication links of a wireless communication system, such as one or more communication links of the WLAN 100 described with reference to FIG. 1.

The wireless communication manager 420-*b* may be used to manage at least one aspect of wireless communication for the apparatus 405. The wireless communication manager 420-*b* may include a PHY layer header processor 435 and/or an intra-frame operations manager 440. In some examples, part or all of the PHY layer header processor 435 and/or intra-frame operations manager 440 may be incorporated into the receiver 410.

The PHY layer header processor 435 may be used to receive a first physical layer header of a first WLAN protocol data unit over a shared radio frequency spectrum band. The physical layer header may include at least a first identifier of a BSS and a first device AID. The first WLAN protocol data unit may be an example of aspects of the WLAN protocol data unit described with reference to FIGS. 2 and 3.

The intra-frame operations manager 440 may be used to perform an intra-frame operation based at least in part on the first identifier of the BSS and the first device AID. The intra-frame operation may include a power saving operation and/or a receive filtering operation.

Figure 5:
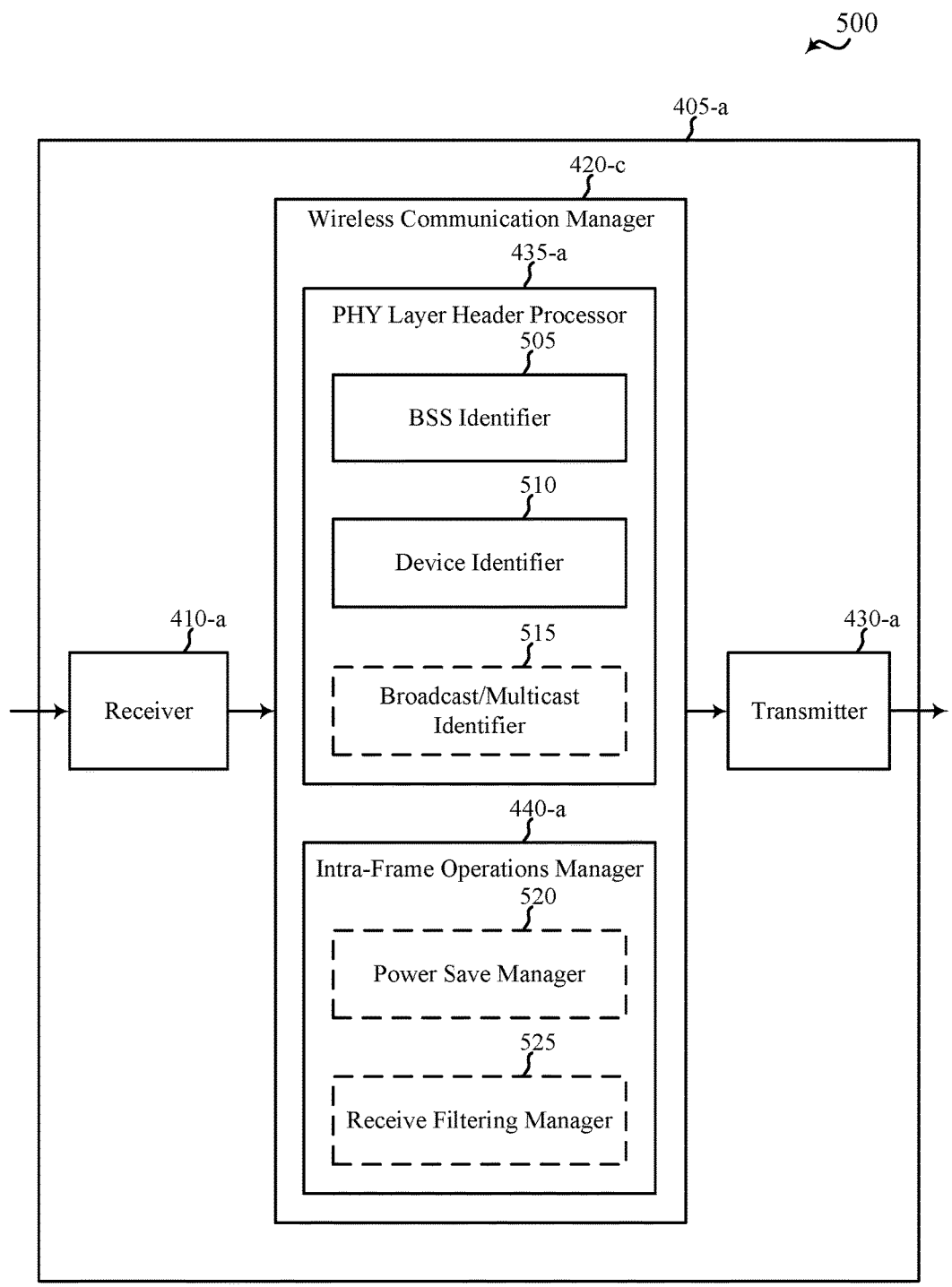
FIG. 5 shows a block diagram of an apparatus for use in wireless communication, in accordance with various aspects of the present disclosure.

FIG. 5 shows a block diagram 500 of an apparatus 405-*a* for use in wireless communication, in accordance with various aspects of the present disclosure. The apparatus 405-*a* may be an example of aspects of the AP 105 described with reference to FIG. 1 and/or the apparatus 405 described with reference to FIG. 4. The apparatus 405-*a* may also be or include a processor (not shown). The apparatus 405-*a* may include a receiver 410-*a*, a wireless communication manager 420-*c*, and/or a transmitter 430-*a*. Each of these components may be in communication with each other.

The receiver 410-*a*, wireless communication manager 420-*c*, and transmitter 430-*a* may be respective examples of the receiver 410, wireless communication manager 420-*b*, and transmitter 430 described with reference to FIG. 4. As shown in FIG. 5, the wireless communication manager 420-*c* may include a PHY layer header processor 435-*a* and/or an intra-frame operations manager 440-*a*. The PHY layer header processor 435-*a* may include a BSS identifier 505, a device identifier 510, and/or a broadcast/multicast identifier 515. The intra-frame operations manager 440-*a* may include a power save manager 520 and/or a receive filtering manager 525. In some examples, part or all of the PHY layer header processor 435-*a* and/or intra-frame operations manager 440-*a* may be incorporated into the receiver 410-*a*.

The PHY layer header processor 435-*a* may be used to receive a first physical layer header of a first WLAN protocol data unit over a shared radio frequency spectrum band. The physical layer header may include at least a first identifier of a BSS and a first device AID. In some examples, receiving the first physical layer header may include receiving the first identifier of a BSS in a first WLAN signaling field, and receiving the first device AID in a second WLAN signaling field. The first WLAN signaling field and the second WLAN signaling field may be separately encoded. The first device AID may include a partial AID of the receiving device (e.g., a partial AID of an intended station receiver of the first WLAN protocol data unit) XORed with a partial BSSID. The first WLAN protocol data unit may be an example of aspects of the WLAN protocol data unit described with reference to FIGS. 2 and 3.

The BSS identifier 505 may be used to compare a second identifier of a BSS to the first identifier of a BSS. The second identifier of a BSS may identify a BSS used by the receiving device. The device identifier 510 may be used to compare a second device AID of the receiving device to the first device AID. The broadcast/multicast identifier 515 may optionally be used to compare a broadcast/multicast AID to the first device AID.

The intra-frame operations manager 440-*a* may be used to perform an intra-frame operation based at least in part on the comparisons made by the BSS identifier 505, the device identifier 510, and/or the broadcast/multicast identifier 515. The intra-frame operation may include a power saving operation and/or a receive filtering operation.

The power save manager 520 may be used to enter a power save mode for a remainder of the first WLAN protocol data unit based at least in part on the second identifier matching the first identifier and the second device AID not matching the first device AID. In some examples, the power save manager 520 may also enter the power save mode based at least in part on the broadcast/multicast AID not matching the first device AID (i.e., the broadcast/multicast AID not matching the first device AID may be an additional condition to be met, along with the other conditions, before entering the power save mode).

The receive filtering manager 525 may be used to discontinue a decoding of the first WLAN protocol data unit based at least in part on the second identifier not matching the first identifier. The receive filtering manager 525 may also be used to discontinue the decoding of the first WLAN protocol data unit based at least in part on the second device AID not matching the first device AID (and in some cases, based at least in part on the second device AID not matching the first device AID and the broadcast/multicast AID not matching the first device AID).

Discontinuing the decoding of the first WLAN protocol data unit may enable the apparatus 405-*a* to receive a second physical layer header of a second WLAN protocol data unit (e.g., during transmission of the first WLAN protocol data unit and after discontinuing the decoding of the first WLAN protocol data unit).

Figure 6:
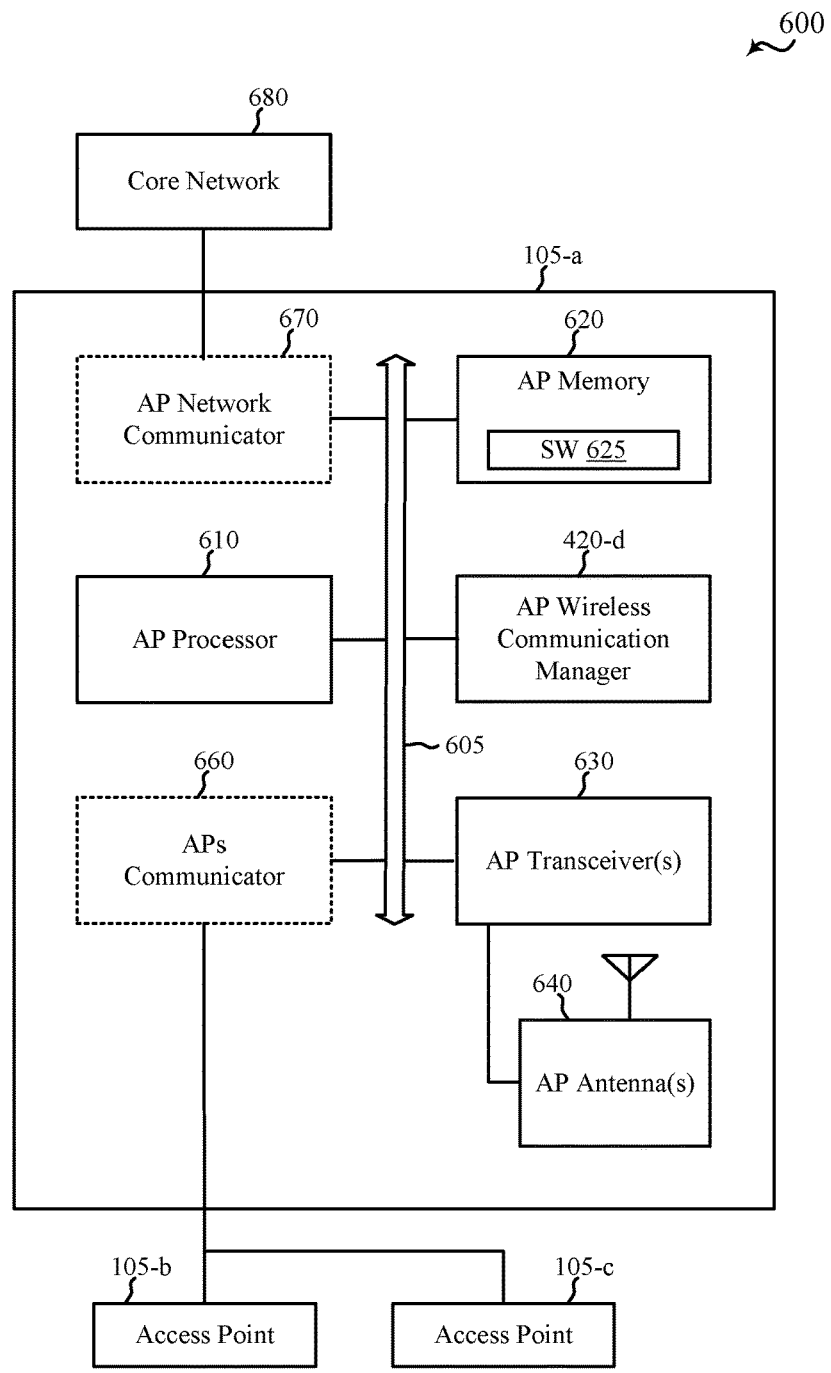
FIG. 6 shows a block diagram of an AP to generate, transmit, and/or decode WLAN protocol data units, in accordance with various aspects of the present disclosure.

Turning to FIG. 6, a diagram 600 is shown that illustrates an AP 105-*a* to generate, transmit, and/or decode WLAN protocol data units, such as WLAN protocol data units conforming to an IEEE 802.11 standard (e.g., the WLAN protocol data units described above with reference to FIGS. 2 and 3), in accordance with various aspects of the present disclosure. In some aspects, the AP 105-*a* may be an example of aspects of the AP 105 described with reference to FIG. 1 or the apparatuses 405 described with reference of FIGS. 4 and 5. The AP 105-*a* may include an AP processor 610, an AP memory 620, one or more AP transceivers 630, one or more AP antennas 640, and/or an AP wireless communication manager 420-*d*. The AP wireless communication manager 420-*d* may be an example of the AP wireless communication manager (or wireless communication manager 420) of FIGS. 1, 4, and 5. The AP 105-*a* may also include one or both of an APs communicator 660 and a network communicator 670. Each of these components may be in communication with each other, directly or indirectly, over at least one bus 605.

The AP memory 620 may include random access memory (RAM) and/or read-only memory (ROM). The memory 620 may also store computer-readable, computer-executable software (SW) code 625 containing instructions that, when executed, cause the AP processor 610 to perform various functions described herein for wireless communication, including the generation, transmission, and/or decoding of WLAN protocol data units. Alternatively, the SW code 625 may not be directly executable by the AP processor 610, but may cause the AP 105-*a*, e.g., when compiled and executed, to perform functions described herein.

The AP processor 610 may include an intelligent hardware device (e.g., a central processing unit (CPU), a microcontroller, an ASIC, etc.). The AP processor 610 may process information received through the AP transceivers 630, the APs communicator 660, and/or the network communicator 670. The AP processor 610 may also process information to be sent to the AP transceiver(s) 630 for transmission through the AP antennas 640, to the APs communicator 660, and/or to the network communicator 670. The AP processor 610 may handle, alone or in connection with the AP wireless communication manager 420-*d*, various aspects related to generating, transmitting, and/or decoding a WLAN protocol data unit.

The AP transceiver(s) 630 may include a modem to modulate packets and provide modulated packets to the AP antenna(s) 640 for transmission, and to demodulate packets received from the AP antenna(s) 640. The AP transceiver(s) 630 may be implemented as at least one transmitter and at least one separate receiver. The AP transceiver(s) 630 may communicate bi-directionally, via the AP antennas 640, with at least one station 115, as illustrated in FIG. 1, for example. The AP 105-*a* may typically include multiple AP antennas 640 (e.g., an antenna array). The AP 105-*a* may communicate with a core network 680 through the AP network communicator 670. The AP 105-*a* may communicate with other APs, such as the AP 105-*b* and/or the AP 105-*c*, using an APs communicator 660.

The AP wireless communication manager 420-*d* may manage communications with stations and/or other devices as illustrated in the WLAN 100 of FIG. 1. The AP wireless communication manager 420-*d* may be a component of the AP 105-*a* in communication with some or all of the other components of the AP 105-*a* over the bus 605. Alternatively, functionality of the AP wireless communication manager 420-*d* may be implemented as a component of the AP transceiver(s) 630, as a computer program product, and/or as a controller element of the AP processor 610.

The components of the AP 105-*a* may implement aspects discussed above with respect FIGS. 1-5, and those aspects may not be repeated here for the sake of brevity. Moreover, the components of the AP 105-*a* may implement aspects discussed below with respect to FIGS. 8-10, and those aspects may not be repeated here also for the sake of brevity.

Figure 7:
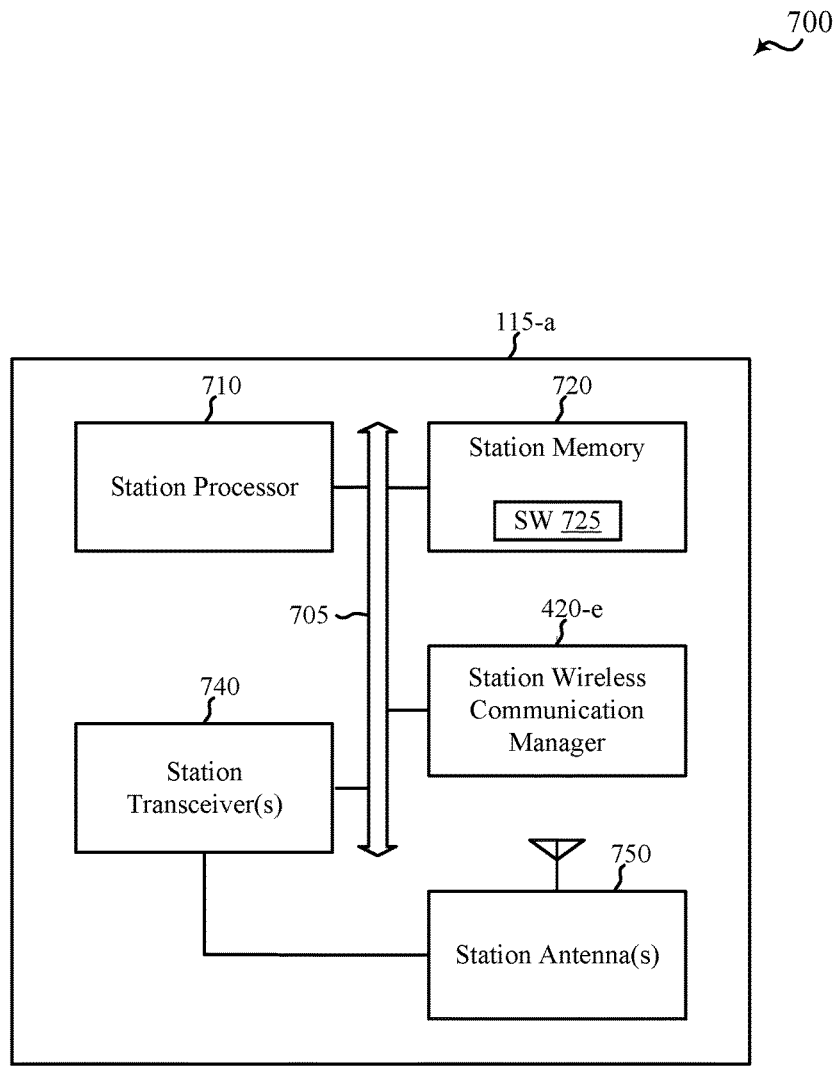
FIG. 7 shows a block diagram of a station to generate, transmit, and/or decode WLAN protocol data units, in accordance with various aspects of the present disclosure.

Turning to FIG. 7, a diagram 700 is shown that illustrates a station 115-*a* to generate, transmit, and/or decode WLAN protocol data units, such as WLAN protocol data units conforming to an IEEE 802.11 standard (e.g., the WLAN protocol data units described above with respect to FIGS. 2 and 3), in accordance with various aspects of the present disclosure. The station 115-*a* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The station 115-*a* may have an internal power supply (not shown), such as a small battery, to facilitate mobile operation. The station 115-*a* may be an example of aspects of the stations 115 described with reference to FIG. 1 or the apparatuses 405 described with reference to FIGS. 4 and 5.

The station 115-*a* may include a station processor 710, a station memory 720, one or more station transceivers 740, one or more station antennas 750, and/or a station wireless communication manager 420-*e*. The station wireless communication manager 420-*e* may be an example of the station wireless communication manager (or wireless communication manager 420) of FIGS. 1, 4, and 5. Each of these components may be in communication with each other, directly or indirectly, over at least one bus 705.

The station memory 720 may include RAM and/or ROM. The station memory 720 may store computer-readable, computer-executable SW code 725 containing instructions that, when executed, cause the station processor 710 to perform various functions described herein for wireless communication, including the generation, transmission, and/or decoding of WLAN protocol data units. Alternatively, the SW code 725 may not be directly executable by the station processor 710, but may cause the station 115-*a* (e.g., when compiled and executed) to perform functions described herein.

The station processor 710 may include an intelligent hardware device (e.g., a CPU, a microcontroller, an ASIC, etc.). The station processor 710 may process information received through the station transceiver(s) 740 and/or to be sent to the station transceiver(s) 740 for transmission through the one or more station antennas 750. The station processor 710 may handle, alone or in connection with the station wireless communication manager 420-*e*, various aspects related to generating, transmitting, and/or decoding a WLAN protocol data unit.

The station transceiver(s) 740 may communicate bi-directionally, via the station antenna(s) 750, with at least one AP 105, as illustrated in FIG. 1, for example. The station transceiver(s) 740 may be implemented as at least one transmitter and at least one separate receiver. The station transceiver(s) 740 may include a modem to modulate the packets and provide the modulated packets to the one or more station antennas 750 for transmission, and to demodulate packets received from the station antenna(s) 750. While the station 115-*a* may include a single antenna, there may be aspects in which the station 115-*a* may include multiple station antennas 750.

The station wireless communication manager 420-*e* may manage communications with APs and/or other devices as illustrated in the WLAN 100 of FIG. 1. The station wireless communication manager 420-*e* may be a component of the station 115-*a* in communication with some or all of the other components of the station 115-*a* over the bus 705. Alternatively, functionality of the station wireless communication manager 420-*e* may be implemented as a component of the station transceiver(s) 740, as a computer program product, and/or as a controller element of the station processor 710.

The components of the station 115-*a* may implement aspects discussed above with respect to FIGS. 1-6, and those aspects may not be repeated here for the sake of brevity. Moreover, the components of the station 115-*a* may implement aspects discussed below with respect to FIGS. 8-10, and those aspects may not be repeated here also for the sake of brevity.

Figure 8:
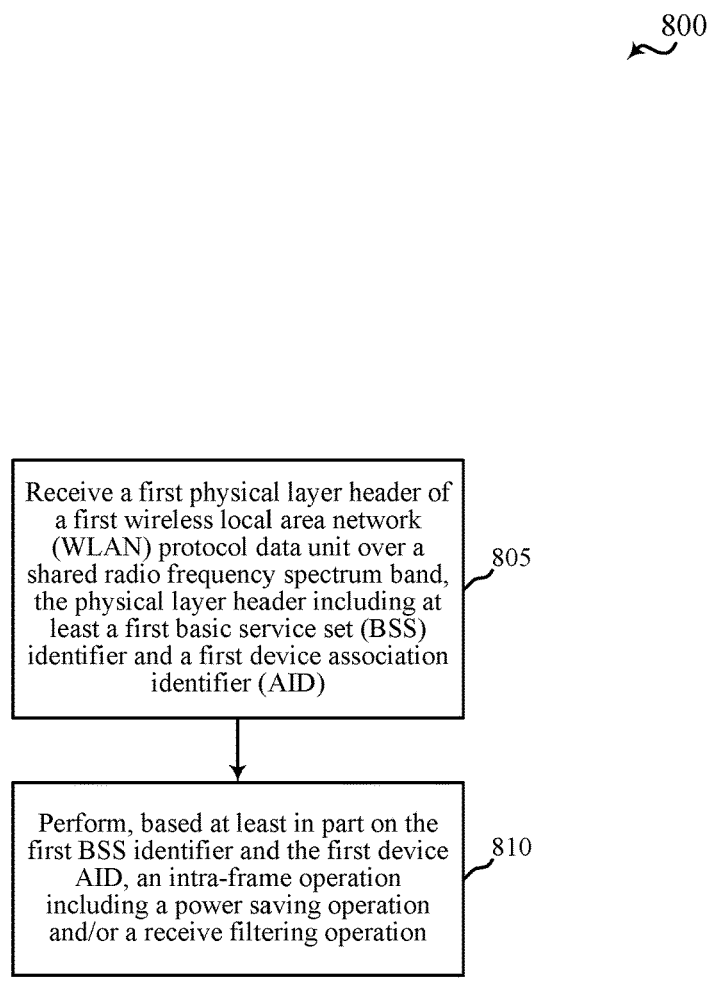
FIG. 8 is a flow chart illustrating an example of a method for wireless communication at a receiving device, in accordance with various aspects of the present disclosure.

FIG. 8 is a flow chart illustrating an example of a method 800 for wireless communication at a receiving device, in accordance with various aspects of the present disclosure. For clarity, the method 800 is described below with reference to aspects of the APs 105 described with reference to FIGS. 1 and 7, aspects of the stations 115 described with reference to FIGS. 1 and 6, or aspects of the apparatuses 405 described with reference to FIGS. 4 and 5. In some examples, an AP, station, and/or apparatus executes sets of codes to control the elements of the AP, station, and/or apparatus to perform the functions described below. Additionally or alternatively, the AP, station, and/or apparatus performs the functions described below using special-purpose hardware.

At block 805, the method 800 includes receiving a first physical layer header of a first WLAN protocol data unit over a shared radio frequency spectrum band. The physical layer header includes at least a first BSS identifier and a first device AID. At block 810, an intra-frame operation is performed based at least in part on the first BSS identifier and the first device AID. The intra-frame operation may be a power saving operation or a receive filtering operation. The operations at blocks 805 and 810 may be performed, for example, using the wireless communication manager 420 described with reference to FIG. 1, 4, 5, or 6. The first WLAN protocol data unit is an example of aspects of the WLAN protocol data unit described with reference to FIGS. 2 and 3. It should be noted that the method 800 is just one implementation and that the operations of the method 800 may be rearranged or otherwise modified such that other implementations are possible.

Figure 9:
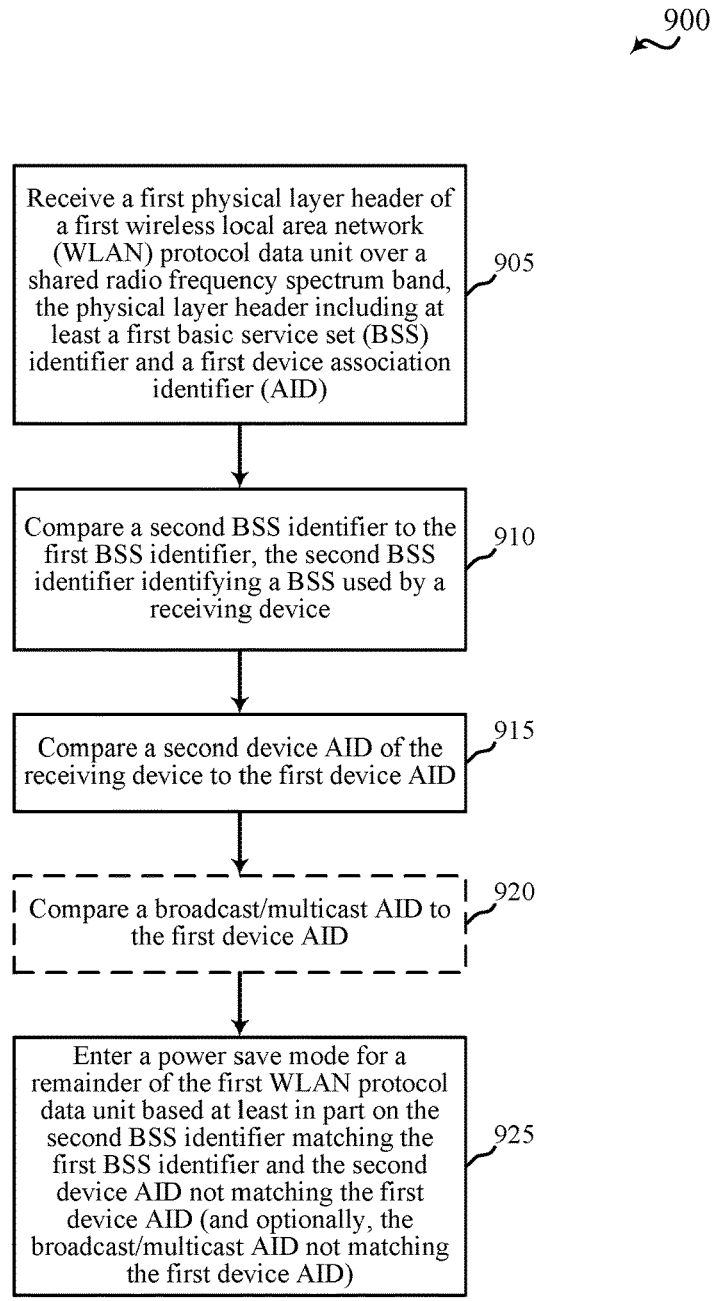
FIG. 9 is a flow chart illustrating an example of a method for wireless communication at a receiving device, in accordance with various aspects of the present disclosure.

FIG. 9 is a flow chart illustrating an example of a method 900 for wireless communication at a receiving device, in accordance with various aspects of the present disclosure. For clarity, the method 900 is described below with reference to aspects of the stations 115 described with reference to FIGS. 1 and 6 or the apparatuses 405 described with reference to FIGS. 4 and 5. In some examples, a station and/or apparatus executes sets of codes to control the elements of the station and/or apparatus to perform the functions described below. Additionally or alternatively, the station and/or apparatus performs the functions described below using special-purpose hardware.

At block 905, a first physical layer header of a first WLAN protocol data unit is received over a shared radio frequency spectrum band. The physical layer header includes at least a first BSS identifier and a first device AID. In some examples, receiving the first physical layer header includes receiving the first BSS identifier in a first WLAN signaling field, and receiving the first device AID in a second WLAN signaling field. The first WLAN signaling field and the second WLAN signaling field may be separately encoded. The first device AID may include a partial AID of the receiving device (e.g., a partial AID of an intended station receiver of the first WLAN protocol data unit) XORed with a partial BSSID.

Proceeding to block 910, a second BSS identifier (which may identify a BSS used by the receiving device) is compared to the first BSS identifier. At block 915, a second device AID of the receiving device is compared to the first device AID. In some embodiments, the process flows to block 920, while in some other embodiments, the process flows from block 915 directly to block 925. At block 920, a broadcast/multicast AID is compared to the first device AID. At block 925, an intra-frame operation is performed, such as a power saving operation, based at least in part on the comparisons performed at block 910, 915, and/or 920. Performing the power saving operation may include entering a power save mode for a remainder of the first WLAN protocol data unit based at least in part on the second BSS identifier matching the first BSS identifier and the second device AID not matching the first device AID. In some examples, entering the power save mode may also be based at least in part on the broadcast/multicast AID not matching the first device AID (i.e., the broadcast/multicast AID not matching the first device AID may be an additional condition to be met, along with the other conditions, before entering the power save mode). The operations at blocks 905, 910, 915, 920, and 925 may be performed, for example, using the wireless communication manager 420 described with reference to FIG. 1, 4, 5, or 6. The first WLAN protocol data unit is an example of aspects of the WLAN protocol data unit described with reference to FIGS. 2 and 3. It should be noted that method 900 is just one implementation and that the operations of the method 900 may be rearranged or otherwise modified such that other implementations are possible.

Figure 10:
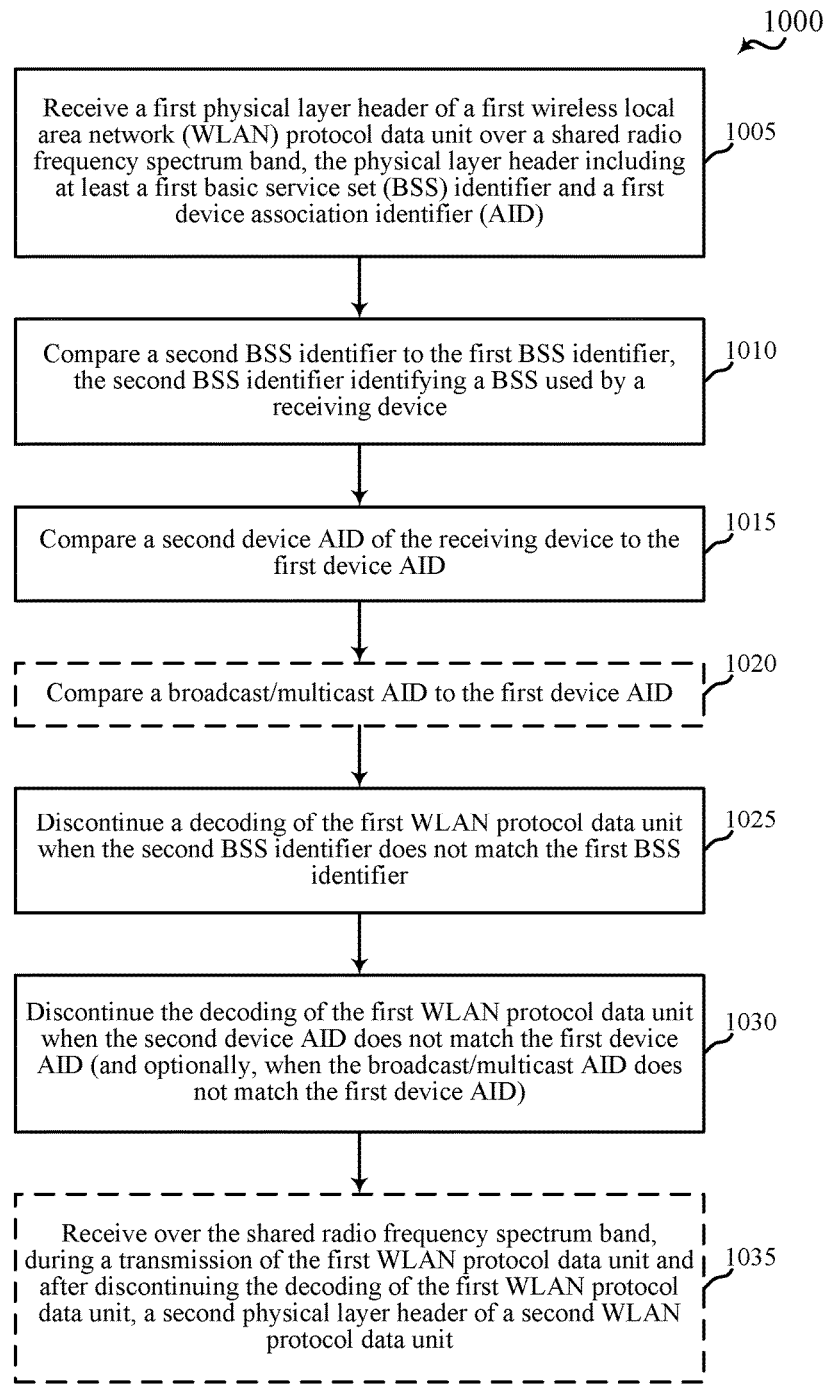
FIG. 10 is a flow chart illustrating an example of a method for wireless communication at a receiving device, in accordance with various aspects of the present disclosure.

FIG. 10 is a flow chart illustrating an example of a method 1000 for wireless communication at a receiving device, in accordance with various aspects of the present disclosure. For clarity, the method 1000 is described below with reference to aspects of the APs 105 described with reference to FIGS. 1 and 7, aspects of the stations 115 described with reference to FIGS. 1 and 6, or aspects of the apparatuses 405 described with reference to FIGS. 4 and 5. In some examples, an AP, station, and/or apparatus executes sets of codes to control the elements of the AP, station, and/or apparatus to perform the functions described below. Additionally or alternatively, the AP, station, and/or apparatus performs the functions described below using special-purpose hardware.

At block 1005, a first physical layer header of a first WLAN protocol data unit is received over a shared radio frequency spectrum band. The physical layer header includes at least a first BSS identifier and a first device AID. In some examples, receiving the first physical layer header includes receiving the first BSS identifier in a first WLAN signaling field, and receiving the first device AID in a second WLAN signaling field. The first WLAN signaling field and the second WLAN signaling field may be separately encoded. When the receiving device is a station, the first device AID may include a partial AID of the station (e.g., a partial AID of an intended station receiver of the first WLAN protocol data unit) XORed with a partial BSSID. When the receiving device is an AP, the first device AID may include a partial BSSID (e.g., a partial BSSID of an intended AP receiver of the first WLAN protocol data unit).

At block 1010, a second BSS identifier (which may identify a BSS used by the receiving device) is compared to the first BSS identifier. At block 1015, a second device AID of the receiving device is compared to the first device AID. In some embodiments, the process flows to block 1020, while in some other embodiments, the process flows from block 1015 directly to block 1025. At block 1020, a broadcast/multicast AID is compared to the first device AID.

At block 1025 or 1030, the method 1000 may include performing an intra-frame operation, such as a receive filtering operation, based at least in part on the comparisons performed at block 1010, 1015, and/or 1020. At block 1025, performing the receive filtering operation may include discontinuing a decoding of the first WLAN protocol data unit based at least in part on the second BSS identifier not matching the first BSS identifier. At block 1030, performing the receive filtering operation may include discontinuing the decoding of the first WLAN protocol data unit based at least in part on the second device AID not matching the first device AID (and in some cases, based at least in part on the second device AID not matching the first device AID and the broadcast/multicast AID not matching the first device AID).

At block 1035, during a transmission of the first WLAN protocol data unit and after discontinuing the decoding of the first WLAN protocol data unit, a second physical layer header of a second WLAN protocol data unit is received over the shared radio frequency spectrum band. The operations at blocks 1005, 1010, 1015, 1020, 1025, 1030, and 1035 may be performed using the wireless communication manager 420 described with reference to FIG. 1, 4, 5, or 6. The first WLAN protocol data unit may be an example of aspects of the WLAN protocol data unit described with reference to FIGS. 2 and 3. It should be noted that method 1000 is just one implementation and that the operations of the method 1000 may be rearranged or otherwise modified such that other implementations are possible.

Aspects of the methods 800, 900, and/or 1000, described with reference to FIGS. 8, 9, and/or 10, may be combined.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, at least one microprocessor in conjunction with a DSP core, or any other such configuration.

The functions described herein may be implemented in hardware, software executed by a processor, firmware, or any combination thereof. If implemented in software executed by a processor, the functions may be stored on or transmitted as instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of") indicates a disjunctive list such that, for example, a list of "A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Throughout this disclosure the term "example" or "exemplary" indicates an example or instance and does not imply or require any preference for the noted example. Thus, the disclosure is not to be limited to the examples and designs described herein but is to be accorded the broadest scope consistent with the principles and novel features disclosed herein.

What is claimed is:

1. A method for wireless communication at a receiving device, comprising:
   receiving a first physical layer header of a first wireless local area network (WLAN) protocol data unit, sent by a transmitting device, over a shared radio frequency spectrum band, the first physical layer header comprising at least a value of a color field and at least one of a first device identifier or an uplink/downlink indicator, wherein the value of the color field indicates a first identifier of a basic service set (BSS) and the value of the color field is selected by the transmitting device;
   comparing a second identifier of a BSS to the first identifier of the BSS, the second identifier of the BSS identifying a BSS used by the receiving device; and
   performing an intra-frame operation based at least in part on the comparison and the at least one of the first device identifier or the uplink/downlink indicator.

2. The method of claim 1, further comprising:
   comparing a second device identifier to the first device identifier, wherein the intra-frame operation is performed based at least in part on the second identifier of the BSS matching the first identifier of the BSS and the second device identifier not matching the first device identifier.

3. The method of claim 2, further comprising:
   comparing a broadcast/multicast association identifier (AID) to the first device identifier;
   wherein the intra-frame operation is performed further based at least in part on the broadcast/multicast AID not matching the first device identifier.

4. The method of claim 3, wherein the intra-frame operation comprises a receive filtering operation, and wherein performing the receive filtering operation comprises:
   discontinuing a decoding of the first WLAN protocol data unit.

5. The method of claim 2, wherein the intra-frame operation comprises a receive filtering operation, and wherein performing the receive filtering operation comprises:
   discontinuing a decoding of the first WLAN protocol data unit.

6. The method of claim 5, further comprising:
   receiving over the shared radio frequency spectrum band, during a transmission of the first WLAN protocol data unit and after discontinuing the decoding of the first WLAN protocol data unit, a second physical layer header of a second WLAN protocol data unit.

7. The method of claim 2, wherein the intra-frame operation is a power saving operation, and wherein performing the power saving operation comprises:
   entering a doze state for a remainder of the first WLAN protocol data unit.

8. The method of claim 1, wherein the first device identifier comprises a partial association identifier (AID) of an intended station receiver of the first WLAN protocol data unit exclusive-ORed (XORed) with a partial basic service set identifier (BSSID).

9. The method of claim 1, wherein the first device identifier comprises a partial BSSID of an intended access point (AP) receiver of the first WLAN protocol data unit.

10. The method of claim 1, wherein receiving the first physical layer header comprises:
receiving the first identifier of the BSS in a first WLAN signaling field; and
receiving the first device identifier in a second WLAN signaling field, wherein the first WLAN signaling field and the second WLAN signaling field are separately encoded.

11. The method of claim 1, further comprising:
comparing a second device identifier to the first device identifier, wherein the intra-frame operation comprises a receive filtering operation, and wherein performing the receive filtering operation comprises:
discontinuing a decoding of the first WLAN protocol data unit based at least in part on the second identifier of the BSS not matching the first identifier of the BSS and the second device identifier matching the first device identifier.

12. The method of claim 1, wherein the intra-frame operation comprises a receive filtering operation, the method further comprising:
comparing a broadcast/multicast AID to the first device identifier, wherein performing the receive filtering operation comprises:
discontinuing a decoding of the first WLAN protocol data unit based at least in part on the second identifier of the BSS not matching the first identifier of the BSS; and the second device identifier matching the first device identifier and the broadcast/multicast AID not matching the first device identifier.

13. The method of claim 1, wherein the intra-frame operation is selected from a group consisting of:
a power saving operation, a receive filtering operation, and a statistics collection operation.

14. The method of claim 1, further comprising:
determining that the first device identifier is a first device association identifier (AID) associated with the receiving device based at least in part on the uplink/downlink indicator.

15. The method of claim 1, wherein the first device identifier is a first device association identifier (AID) associated with the transmitting device.

16. The method of claim 1, wherein the first physical layer header comprises an indicator that identifies whether the WLAN protocol data unit is for uplink communications or downlink communications, and the indicator further identifies whether the first device identifier is for the receiving device or for a transmitting device.

17. The method of claim 1, further comprising:
determining that the first device identifier is a first device association identifier (AID) associated with the transmitting device based at least in part on the uplink/downlink indicator.

18. The method of claim 1, further comprising:
comparing a second device identifier to the first device identifier, wherein the intra-frame operation is performed based at least in part on the second identifier of the BSS matching the first identifier of the BSS and the second device identifier matching the first device identifier.

19. An apparatus for wireless communication at a receiving device, comprising:
a physical layer header processor to receive a first physical layer header of a first wireless local area network (WLAN) protocol data unit, sent by a transmitting device, over a shared radio frequency spectrum band, the first physical layer header comprising at least a value of a color field and at least one of a first device identifier or an uplink/downlink indicator, wherein the value of the color field indicates a first identifier of a basic service set (BSS) and the value of the color field is selected by the transmitting device;
a BSS identifier to compare a second identifier of a BSS to the first identifier of the BSS, the second identifier of the BSS identifying a BSS used by the receiving device; and
an intra-frame operations manager to perform an intra-frame operation based at least in part on the comparison and the at least one of the first device identifier or the uplink/downlink indicator.

20. The apparatus of claim 19, further comprising:
a device identifier to compare a second device identifier to the first device identifier, wherein the intra-frame operations manager performs the intra-frame operation based at least in part on the second identifier of the BSS matching the first identifier of the BSS and the second device identifier not matching the first device identifier.

21. The apparatus of claim 20, further comprising:
a broadcast/multicast identifier to compare a broadcast/multicast association identifier (AID) to the first device identifier;
wherein the intra-frame operations manager performs the intra-frame operation based at least in part on the broadcast/multicast AID not matching the first device identifier.

22. The apparatus of claim 21, wherein
the intra-frame operation comprises a receive filtering operation,
wherein the intra-frame operations manager performs the receive filtering operation by discontinuing a decoding of the first WLAN protocol data unit.

23. The apparatus of claim 20, wherein the intra-frame operation comprises a receive filtering operation, and wherein the intra-frame operations manager performs the receive filtering operation by discontinuing a decoding of the first WLAN protocol data unit.

24. The apparatus of claim 23, wherein the physical layer header processor receives over the shared radio frequency spectrum band, during a transmission of the first WLAN protocol data unit and after discontinuing the decoding of the first WLAN protocol data unit, a second physical layer header of a second WLAN protocol data unit.

25. The apparatus of claim 20, wherein the intra-frame operation is a power saving operation, and wherein performing the power saving operation comprises:
entering a doze state for a remainder of the first WLAN protocol data unit.

26. The apparatus of claim 19, wherein the first device identifier comprises a partial association identifier (AID) of an intended station receiver of the first WLAN protocol data unit exclusive-ORed (XORed) with a partial basic service set identifier (BSSID).

27. The apparatus of claim 19, wherein the first device identifier comprises a partial BSSID of an intended access point (AP) receiver of the first WLAN protocol data unit.

28. The apparatus of claim 19, wherein the physical layer header processor receives the first physical layer header by receiving the first BSS identifier in a first WLAN signaling field, and receiving the first device identifier in a second WLAN signaling field, wherein the first WLAN signaling field and the second WLAN signaling field are separately encoded.

29. The apparatus of claim 19, wherein the intra-frame operation is selected from a group consisting of:
a power saving operation, a receive filtering operation, and a statistics collection operation.

30. The apparatus of claim 19, wherein the first device identifier is a first device association identifier (AID) and the second device identifier is a second AID.

31. The apparatus of claim 19, wherein the first physical layer header comprises an indicator that identifies whether the WLAN protocol data unit is for uplink communications or downlink communications.

32. The apparatus of claim 19, wherein the intra-frame operation is selected from a group consisting of:
a power saving operation, a receive filtering operation, and a statistics collection operation.

33. An apparatus for wireless communication at a receiving device, comprising:
means for receiving a first physical layer header of a first wireless local area network (WLAN) protocol data unit, sent by a transmitting device, over a shared radio frequency spectrum band, the first physical layer header comprising at least a value of a color field and at least one of a first device identifier or an uplink/downlink indicator, wherein the value of the color field indicates a first identifier of a basic service set (BSS) and the value of the color field is selected by the transmitting device;
means for comparing a second identifier of a BSS to the first identifier of the BSS, the second identifier of the BSS identifying a BSS used by the receiving device; and
means for performing an intra-frame operation based at least in part on the comparison and the at least one of the first device identifier or the uplink/downlink indicator.

34. The apparatus of claim 33, further comprising:
means for comparing a second device identifier to the first device identifier, wherein the means for performing the intra-frame operation comprises:
means for performing the intra-frame operation based at least in part on the second identifier of the BSS matching the first identifier of the BSS and the second device identifier not matching the first device identifier.

35. The apparatus of claim 34, further comprising:
means for comparing a broadcast/multicast association identifier (AID) to the first device identifier;
wherein performing the intra-frame operation is further based at least in part on the broadcast/multicast AID not matching the first device identifier.

36. The apparatus of claim 35, wherein
the intra-frame operation comprises a receive filtering operation, and wherein the means for performing the receive filtering operation comprises:
means for discontinuing a decoding of the first WLAN protocol data unit.

37. The apparatus of claim 34, wherein the intra-frame operation comprises a receive filtering operation, and wherein the means for performing the receive filtering operation comprises:
means for discontinuing a decoding of the first WLAN protocol data unit.

38. The apparatus of claim 34, wherein the intra-frame operation is a power saving operation, and wherein performing the power saving operation comprises:
entering a doze state for a remainder of the first WLAN protocol data unit.

39. The apparatus of claim 33, wherein the first device identifier comprises a partial association identifier (AID) of an intended station receiver of the first WLAN protocol data unit exclusive-ORed (XORed) with a partial basic service set identifier (BSSID).

40. The apparatus of claim 33, wherein the first device identifier comprises a partial BSSID of an intended access point (AP) receiver of the first WLAN protocol data unit.

41. The apparatus of claim 33, wherein the first device identifier is a first device association identifier (AID) and the second device identifier is a second AID.

42. The apparatus of claim 33, wherein the first physical layer header comprises an indicator that identifies whether the WLAN protocol data unit is for uplink communications or downlink communications.

43. A non-transitory computer-readable medium storing code for wireless communication at a receiving device, the code comprising instructions executable to cause the receiving device to:
receive a first physical layer header of a first wireless local area network (WLAN) protocol data unit, sent by a transmitting device, over a shared radio frequency spectrum band, the first physical layer header comprising at least value of a color field and at least one of a first device identifier or an uplink/downlink indicator, wherein the value of the color field indicates a first identifier of a basic service set (BSS) and the value of the color field is selected by the transmitting device;
compare a second identifier of a BSS to the first identifier of the BSS, the second identifier of the BSS identifying a BSS used by the receiving device; and
perform an intra-frame operation based at least in part on the comparison and the at least one of the first device identifier or the uplink/downlink indicator.

44. A method for wireless communication at a transmitting device, comprising:
selecting a value of a color field;
transmitting, to a receiver, a first physical layer header of a first wireless local area network (WLAN) protocol data unit over a shared radio frequency spectrum band, the first physical layer header comprising the value of the color field in a first WLAN signaling field and a first device identifier in a second WLAN signaling field, wherein the value of the color field indicates a first identifier of a basic service set (BSS).

* * * * *